US007233407B1

(12) United States Patent
Simchik et al.

(10) Patent No.: US 7,233,407 B1
(45) Date of Patent: Jun. 19, 2007

(54) DOCUMENT PRODUCTION SYSTEM FOR CAPTURING WEB PAGE CONTENT

(75) Inventors: Andrew D. Simchik, Rochester, NY (US); Kristinn R. Rzepkowski, Rochester, NY (US); Thomas J. Perry, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 427 days.

(21) Appl. No.: 09/496,698

(22) Filed: Feb. 2, 2000

(51) Int. Cl.
*G06F 3/12* (2006.01)
*G06K 15/00* (2006.01)

(52) U.S. Cl. ..................... 358/1.15; 358/1.14
(58) Field of Classification Search ........... 358/1.15, 358/1.1, 1.9, 1.13, 1.18, 1.14; 707/512, 513, 707/514, 515
See application file for complete search history.

(56) References Cited

U.S. PATENT DOCUMENTS

| 5,870,767 | A | * | 2/1999 | Kraft, IV | 715/501.1 |
| 6,016,494 | A | * | 1/2000 | Isensee et al. | 707/102 |
| 6,018,774 | A | * | 1/2000 | Mayle et al. | 709/250 |
| 6,061,700 | A | * | 5/2000 | Brobst et al. | 715/517 |
| 6,507,410 | B1 | * | 1/2003 | Robertson et al. | 358/1.18 |
| 6,507,848 | B1 | * | 1/2003 | Crosby et al. | 707/102 |
| 6,529,285 | B2 | * | 3/2003 | Bobrow et al. | 358/1.12 |
| 6,615,234 | B1 | * | 9/2003 | Adamske et al. | 709/203 |
| 6,623,527 | B1 | * | 9/2003 | Hamzy | 715/513 |
| 6,856,415 | B1 | * | 2/2005 | Simchik et al. | 358/1.15 |

FOREIGN PATENT DOCUMENTS

EP    0 538 059 A    4/1993
EP    0 893 760 A    1/1999

OTHER PUBLICATIONS

EPO Search Report; Dated Jun. 11, 2002; Appl. No. EP 00 31 0462.

* cited by examiner

*Primary Examiner*—Douglas Q. Tran
(74) *Attorney, Agent, or Firm*—Fay Sharpe LLP

(57) ABSTRACT

A system and method for converting a page from a network into an image file suitable for assembly of or insertion into a document generated by a document creation algorithm. The system of the invention includes a browser for retrieving a page from the network. The page can be encoded as a page description language (PDL) file representative of the page. A production agent can be provided for translating the PDL file into an image file representative of the page. The image file is of a form and type suitable for assembly or incorporation into the document.

10 Claims, 5 Drawing Sheets

DOCUMENT PRODUCTION SYSTEM FOR CAPTURING WEB PAGE CONTENT

BACKGROUND OF THE INVENTION

The present invention relates to document production systems, and more particularly relates to printing systems for retrieving and inserting content from a network into a document for subsequent printing by the printing system.

The advent of the 'information super highway' or Internet has rapidly increased awareness and acceptance of the Internet as a resource for acquiring content. Hence, the Internet is rapidly replacing more traditional methods for obtaining information, such as books, journals, newspapers, magazines and even television.

The Internet is typically accessed by the use of a web browser, which provides a graphical user interface on a client machine. The web browser is configured for communicating with one or more web servers. If a user wishes to obtain content from a web page at one of the web servers, the user typically initiates a series of manual steps to capture the web page and then print the web page with a suitable printer. For example, the web browser resident on the client machine can capture a web page, which is typically created using Hypertext Markup Language (HTML), and then convert the page into a page description language (PDL) file representative of the page. The PDL file is generally not a readily viewable file, but rather is intended to be sent to a printer that employs appropriate software and hardware for printing the PDL file. If the user desires to acquire multiple web pages, the user must individually capture each web page, and then forward each page individually to the printer. Each web page may include multiple text and graphic files that must each be processed prior to printing. This is a relatively time consuming and manually intensive task.

Furthermore, since the typical web page generally includes content that is frequently updated, the user may need to access and print the web page contemporaneously with the time of use. More specifically, if a user wishes to acquire the most recent content from a web page, the user typically cannot rely upon a web page printed at a prior date. Consequently, the user may need to access the web page multiple times in order to ensure that the most updated content is retrieved.

SUMMARY OF THE INVENTION

The present invention includes a method for converting a page from a network into an image file suitable for assembly or insertion into a document generated by a document creation algorithm. As used herein, the term document creation algorithm is intended to include any application, program, script or function for creating or displaying a document. The document creation algorithm can be stored on a client machine or on a component of another network. The client machine communicates with a printing module via any suitable network connection. The method of the invention includes the steps of launching a browser, retrieving a page from the network (such as the Internet), translating the page into a page description language (PDL) file representative of the page, and then translating the PDL file into an image file representative of the page. The image file is of a form and type suitable for assembly or incorporation into the document.

According to one aspect, the browser is a web browser, and the page is a web page. The method also provides for importing or integrating the image file into the document.

According to another aspect, the method provides for printing the image file with a printing module configured as an image reproduction system.

According to still another aspect, the method provides for inserting a uniform resource locator (URL) into the document, where the URL corresponds to the web page, and then dynamically inserting the image file into the document.

The present invention also provides for a method implemented by a printing system for dynamically linking content present in a page in a network with a document generated by a document creation algorithm. The method includes the steps of inserting a link into the document, where the link corresponds to a page having content present in the network. A browser is then launched in response to the link, thus retrieving the page from the network. The method then converts the page into an image file suitable for insertion into the document.

The present invention also includes a printing system for converting a page from a network into an image file suitable for assembly into a document created by a document creation algorithm. The system includes a browser for accessing the network and for retrieving a page therefrom, and a production facility for translating the page into an image file representative of the page and in a form suitable for assembly into the document.

According to one aspect, the production facility comprises a first translator for translating the page into a page description language (PDL) file representative of the page, and/or a second translator for translating the PDL file into an image file representative of the page.

According to another aspect, the invention includes a link facility for inserting a uniform resource locator (URL) into the document created by the document creation algorithm, where the URL corresponds to a web page present in the network (such as the Internet). The system dynamically and automatically inserts the image file into the document in an interactive session.

The system also provides for a computer-readable medium holding computer-executable instructions for converting a page from a network into an image file suitable for assembly into a document created by a document creation algorithm. The instructions provide for in connection with a web browser comprising translating the page into a page description language (PDL) file representative of the page, and translating the PDL file into an image file representative of the page and suitable for assembly into the document.

Alternatively, the computer-readable medium can hold computer-executable instructions for dynamically linking content present in a page in a network with a document. The instructions provide for inserting a link into the document, where the link corresponds to a page having content present in the network, and converting the page into an image file suitable for insertion within the document.

DESCRIPTION OF ILLUSTRATED EMBODIMENT

An integrated Internet enabled printing system that provides for capturing or retrieving content in a web page from the Internet, and then converting the content in the web page into a format suitable for integration with a document generated by a document creation algorithm. The present invention further provides for inserting particular links within the document, and then later retrieving content corresponding to those links for integration in the document.

Figure 1:
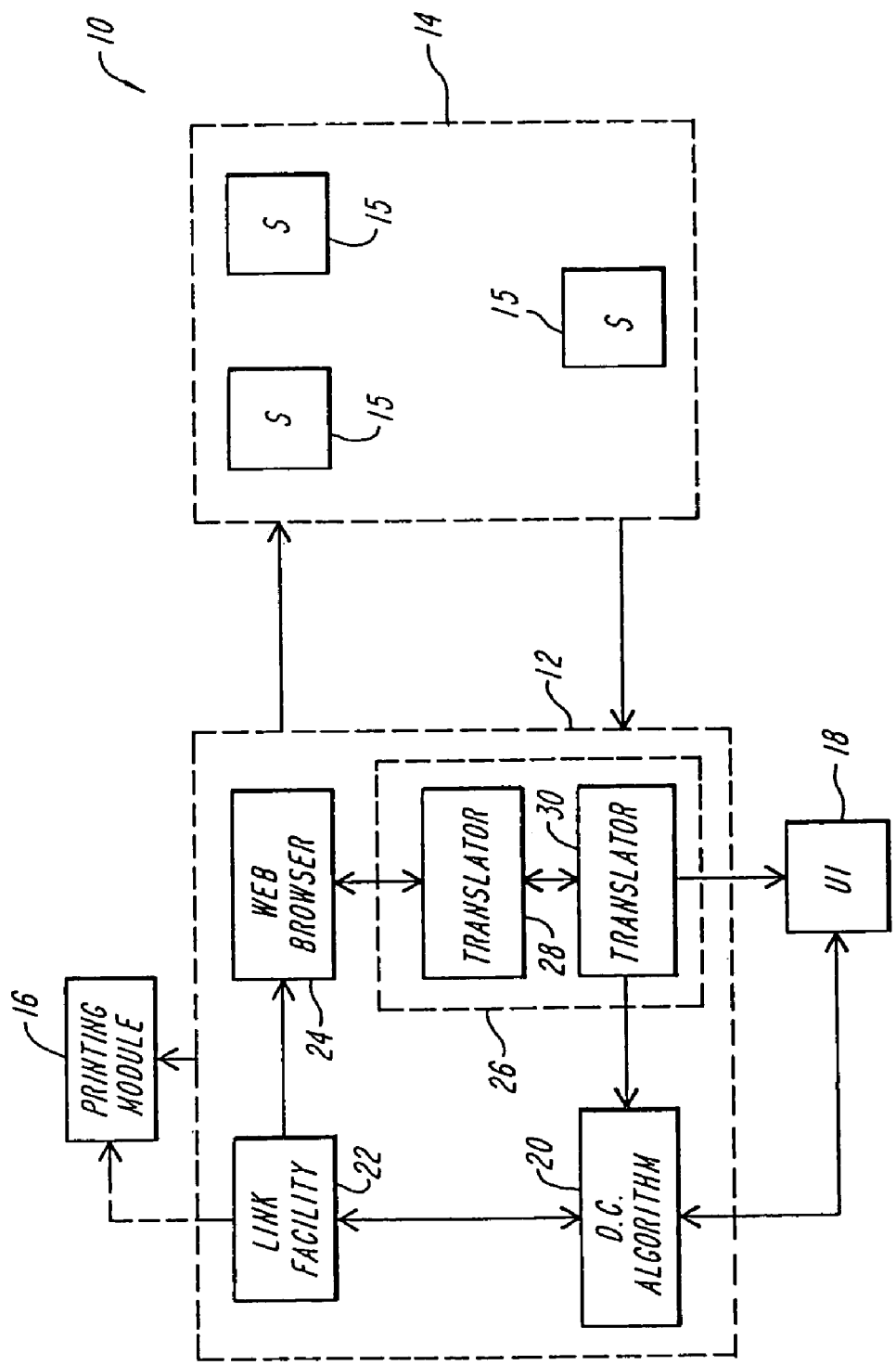
FIG. 1 is a schematic block diagram of a networked printing system according to the teachings of the present invention.

FIG. 1 illustrates a printing system 10 that includes a client machine 12 coupled to a network 14 and to a printing module 16 by any suitable connection. The illustrated client machine 12 can be any suitable IBM compatible personal computer or similar computing apparatus that can be coupled in a network configuration with network 14, and coupled via any suitable communication link, such as a network link, to the printing module 16. The client machine 12 can also form part of an additional network, which in turn communicates with network 14. Hence, the client machine 12 can contain various forms of hardware and software according to known distributed processing techniques. The client machine can also be a pager, cell phone, personal data assistant, and the like. The illustrated network 14 can employ one or more servers, schematically illustrated as servers 15. The servers can be arranged in any conventional manner which would be obvious to those of ordinary skill in the art. The network 14 can be coupled with the client machine 12 to form an overall network, such as a LAN or a WAN, and preferably is configured in a specialty client-server relationship called the Internet. For purposes of clarity, we refer below to the network 14 as the web 14, the servers 15 as the web servers, and the network page as a web page. Those of ordinary skill will readily recognize that the teachings of the invention also apply to all forms of intranets, extranets, IP networks, and the like.

The illustrated client machine 12 can communicate with the web 14 utilizing known functionality's, such as the functionality provided by the hypertext transfer protocol (HTTP). The web 14 includes web servers 15 that all support the TCP/IP protocol suite, and which are addressable to client machines via universal resource locators (URLs). In a conventional web connection, the illustrated client machine 12 employs a browser, such as the web browser 24, which establishes the connection with the web 14 to present information to a system user via the user interface 18. The web servers 15 in the web 14 execute corresponding server software which presents information to the client machine 12 in the form of HTTP responses or packets. The HTTP responses correspond to web pages constructed from a Hypertext Markup Language (HTML), or other server-generated data.

A page designed to be accessed over the web is called a web page. A web page can include any selected content, such as media content including text, graphics, images, and even multi-media objects such as sound recordings or moving video clips, as well as executable content such as software code. In conventional systems, a web page if it contains content of multiple types is usually constructed by loading several separate files, such as a hypertext file, a graphic image file or a sound file. Each web page has a unique address formatted as a URL. When the client machine 12 forwards a request to the web 14 for a web page, the web 14 transmits the web page, which may include multiple files forwarded separately, to the client machine 12. The web browser 24 communicates with the web 14 over a communication link, which can typically be a local area network connection, a wide area connection, a connection over telephone lines, a wireless connection, cable or a combination thereof.

The illustrated printing module 16 can be any image reproduction system, examples of which include electrophotographic, electrostatic, ionographic, and other types of image forming or reproduction systems, which are adapted to capture, store and/or reproduce image data associated with a particular object, such as a document. The system of the present invention is intended to be implemented in a variety of environments, such as in any of the foregoing types of image reproduction systems, and are intended to include any of the DocuTech™ series of printers from Xerox Corporation.

With reference to FIG. 1, the illustrated client machine 12 includes a document creation algorithm 20, which can be any software application or algorithm that can assemble or create a document having selected content, such as text or images. Examples of suitable document creation algorithms suitable for use with the present invention include the DigiPath suite of software manufactured and sold by Xerox Corporation, and more particularly the Document Scan and Make Ready application which forms part of the DigiPath software suite. Other types of document creation or assembly applications suitable for use with the present invention include Adobe Acrobat 4.0, as well as other software which can be employed to create documents suitable for display by the illustrated client machine 12, or suitable for creation and forwarding to the printing module 16 for printing.

The illustrated document creation algorithm 20 is in communication with a link facility 22. The link facility 22 can create network links which can be inserted into a document created by the document creation algorithm 20. The link facility is an optional component and is schematically illustrated as being separate from the production agent 26, although those of ordinary skill in the art will readily recognize that the link facility can form part of the production agent.

The illustrated link facility 22 communicates with a browser, such as the web browser 24, which is commercially available and is intended to include but is not limited to either Netscape Navigator™, NCSA Mosaic, or Internet Explorer™. The illustrated web browser 24 further communicates with a production agent 26 which can include one or more translator facilities such as translator facilities 28 and 30. The translator facilities 28 and 30 are intended to translate or interpret the web page received by the web browser 24 from the web 14, as described below. The production agent 26 is in further communication with a display or monitor, schematically illustrated as the user interface 18.

Figure 2:
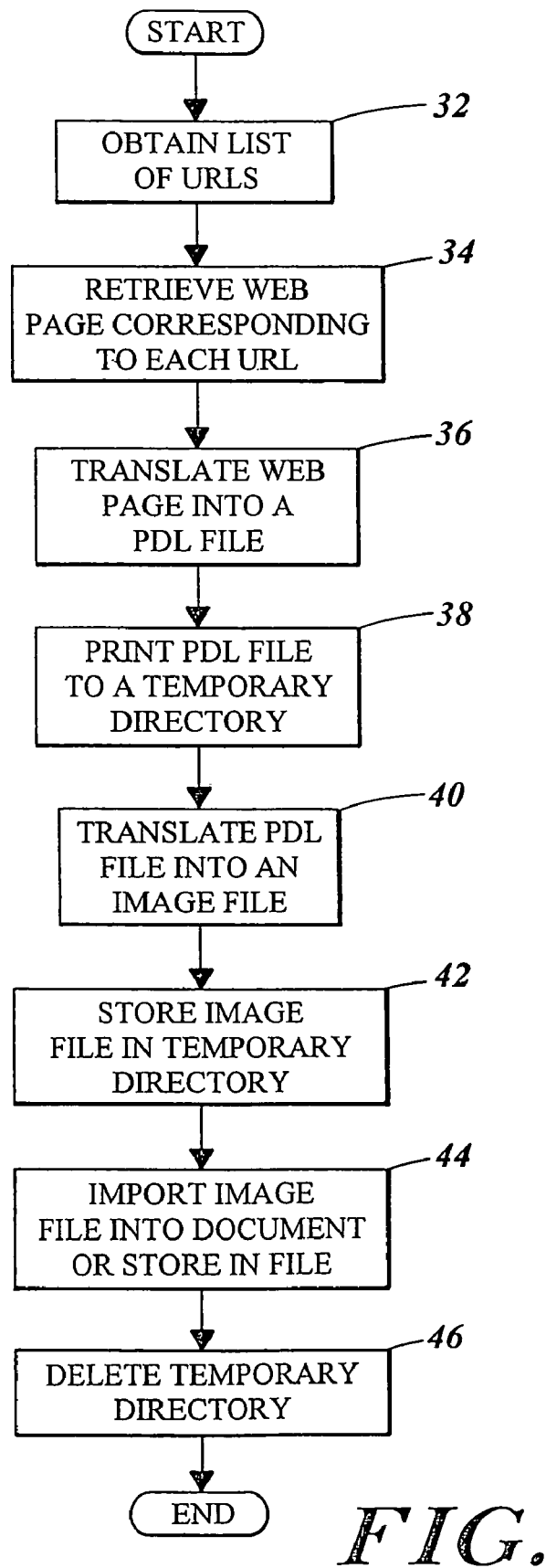
FIG. 2 is a schematic flow-chart diagram illustrating the operation of the printing system of FIG. 1 for capturing content from a web page.

With reference to FIGS. 1 and 2, the illustrated printing system 10 can access and retrieve a web page, which is subsequently converted into an image file for use by the document creation algorithm 20. According to one practice, the client machine 12 launches the web browser 24, which in turn sends a user request to one of the web servers 15 of the web 14. In particular, the web browser 24 employs a URL which defines a particular address of a web page on one of the web servers 15. The URL is a standard way of referencing a particular object on the web 14. It was primarily developed to address the need to have a uniform method for locating various files and data objects on the Internet. A URL has a defined format, which typically includes method://host/path, where the method is the protocol used to access the data body, the host is the fully qualified host name of the web server containing the data, and the path is any method specific data used to determine which data object on the web server is being referenced. Hence, the web browser 24 by employing the URL can point to a file in a particular directory located on a particular web server in the web 14. The web 14 then returns a web page to the client machine 12. The web browser 24 can be adapted to receive the web page, which typically is encoded in HTML. The web browser 24 evaluates the HTML data (media content) associated with the web page to determine if there are any hyper-link statements in the HTML data which would require subsequent browser requests, which can optionally be initiated by the browser. The web browser 24 then transfers the web page to the production agent 26 for translation.

The illustrated production agent 26 can employ a first translator 28 that converts the HTML data associated with the web page into a page description language (PDL) file representative of the web page. For example, the translator 28 can employ Postscript® from Adobe Systems to translate or convert the web page into the PDL file. Those of ordinary skill will also recognize that other types of page description languages can be employed to convert HTML data associated with the web page into a PDL file. Examples of such language types include Envoy, PDF, and PCL. An example of a PDF format language suitable for use with the present invention includes Adobe Acrobat 4.0 from Adobe Systems. In conventional client-server configurations, the translated PDL file is generally directly transferred to a printer, such as the printing module 16, which can contain appropriate software and hardware drivers for converting the PDL file to an appropriate format for printing. Hence, the PDL file is generally not employed or incorporated into a document.

According to the present invention, the production agent 26 includes a second translator 30 selectively or automatically for translating the PDL file into an image file containing image data representative of the web page. The translator 30 translates the PDL file into an image file which is capable of being directly imported into a document being created by the algorithm 20. Further, the translator 30 can automatically create the image file and store the file to disk. The production agent 26 and document creation algorithm 20 can be tightly integrated such that the image file generated by the translator 30 is directly integrated into a document formed by the document creation algorithm. Those of ordinary skill will readily recognize that the first translator 28 can form part of the web browser 24 and that the production agent 26 can be configured as a plug-in for the web browser 24. The image file can be a Tagged Image File Format (TIFF) file, JPEG file, or any other human readable file.

The image file generated by the production agent 26 can be displayed by the user interface 18, or directly imported into the document creation algorithm 20. The image file can be imported into the document in any suitable form, such as a page for insertion therein. Once the document is completed by the document creation algorithm, the document can be forwarded either directly to the printing module 16 for subsequent printing, or transferred to or received into the optional link facility 22 prior to printing.

With particular reference to FIG. 2, the printing system 10 of the present invention employs a method that includes obtaining a list of URLs, which can either be a list stored in the client machine 12, or a list manually provided by a system user. The web browser 24 employs the URL to retrieve a selected web page associated with the URL (step 34). The web page is then transmitted from the web 14 to the web browser 24, which in turn either translates the web page into a PDL file, or transfers the web page to the translator 28 for subsequent conversion into the PDL file (step 36). The PDL file can be printed by the client machine 12 directly to a temporary directory for temporary storage (step 38). The production agent 26 then employs translator 30 to translate the PDL file into an image file (step 40), which is then stored in the temporary directory (step 42). The image file stored in the temporary directory can then be imported into a document created by the document creation algorithm 20, or can be stored in any associated memory provided by the client machine 12 (step 44). The client machine then deletes the temporary directory created by the production agent 26 (step 46).

Figure 3:
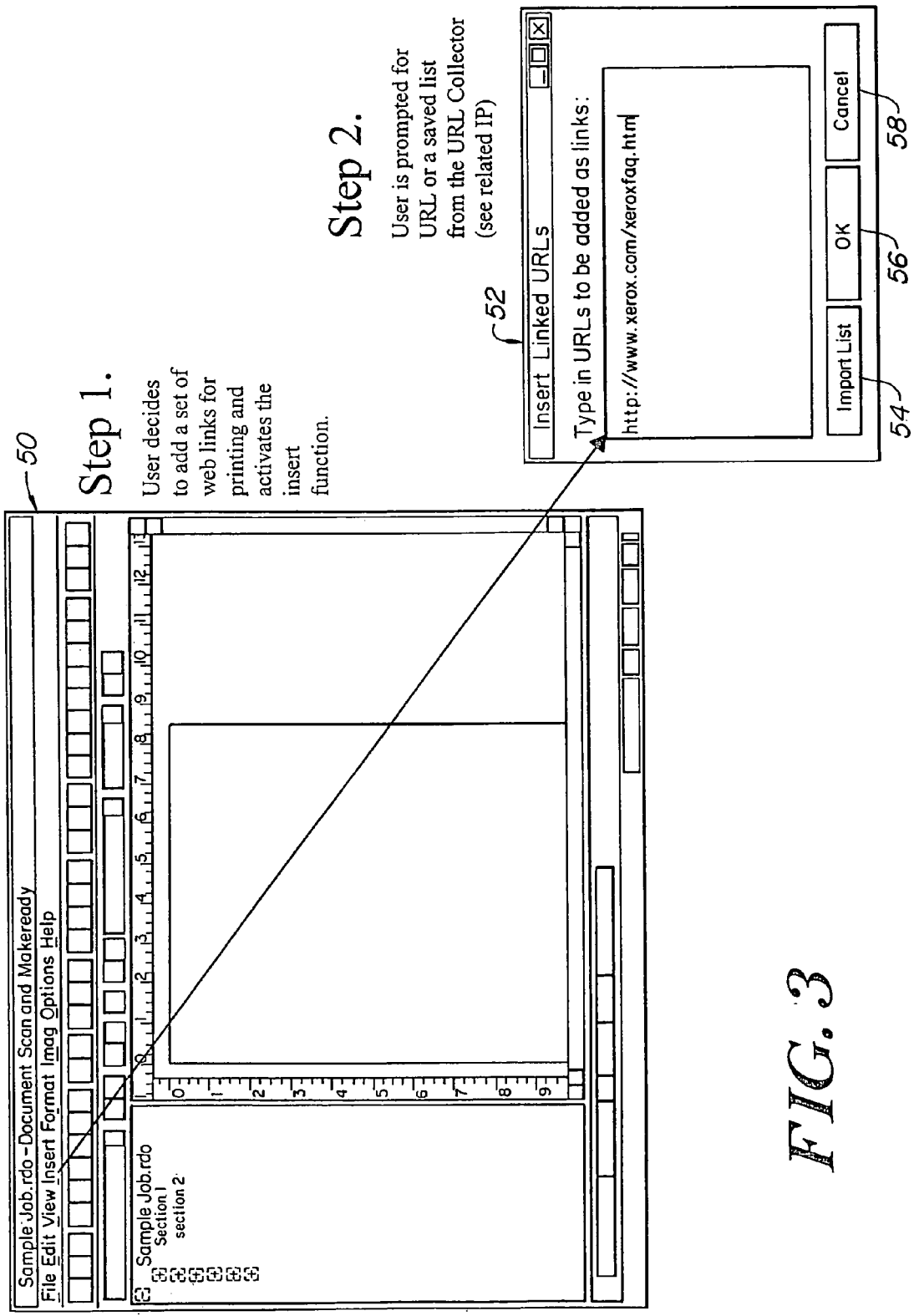
FIGS. 3 and 4 are schematic illustrations of exemplary user interface elements corresponding to the link facility of FIG. 1 in accordance with the teachings of the present invention.
Figure 4:
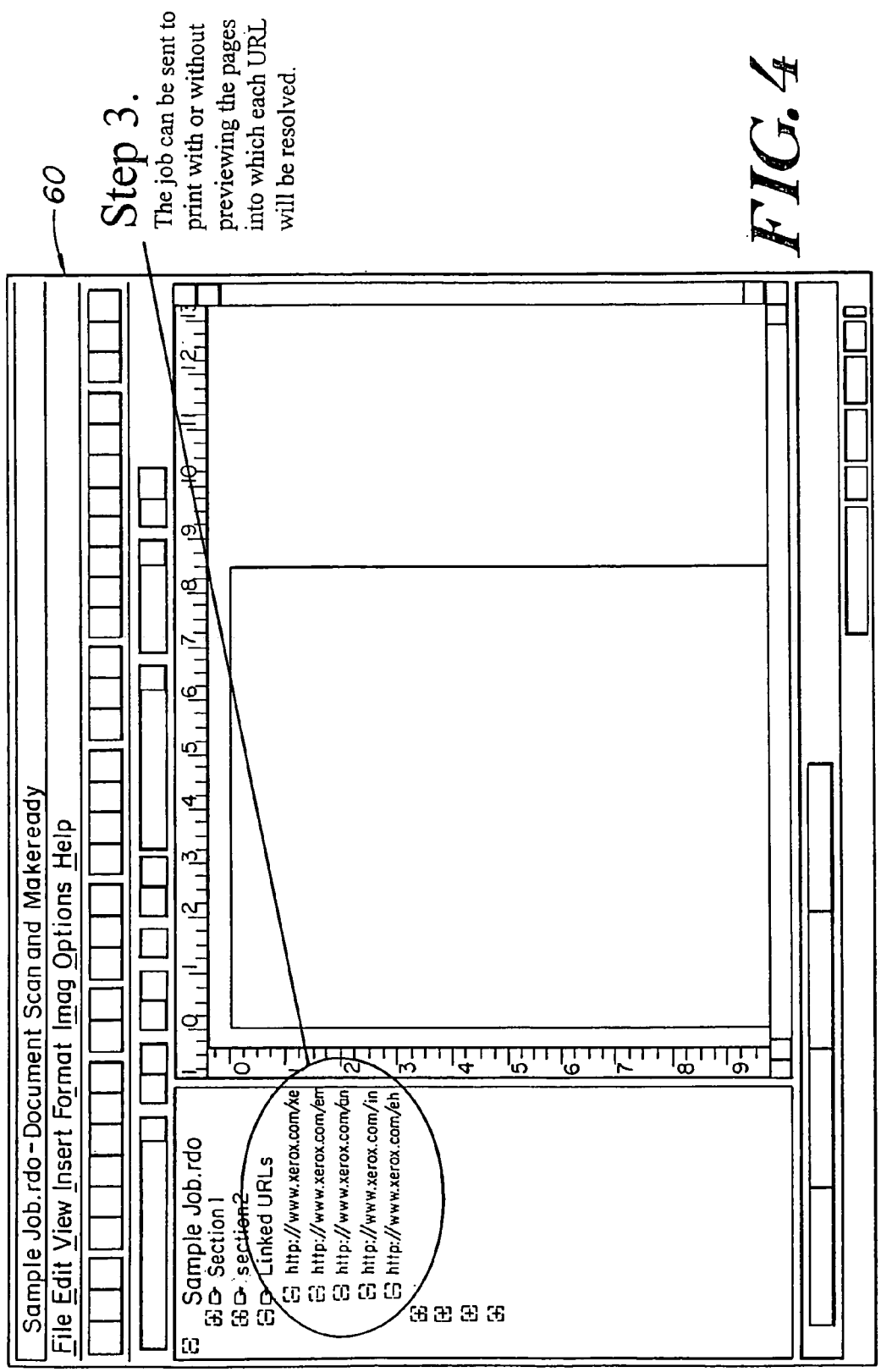

The present invention further provides for the ability to insert one or more links into a document created by the document creation algorithm 20. The links inserted into the document provide for the automatic, dynamic updating, retrieval, and implementation of data for incorporation into a document created by the document creation algorithm. Hence, a user need not manually update a document with content contained on a page, such as a web page, of a network, where the content is dynamically changing. According to the present invention, the user need only provide the link within the document corresponding to the address or location of the page containing the content. With reference to FIGS. 3 and 4, a user interface element, such as the exemplary window 50, can be created by the Document Scan and Make Ready application portion of the DigiPath software suite. The window 50 can include a listing of standard commands, including an insert command which can be actuated to access a second user interface element, such as exemplary window 52. The illustrated window 52 can include a number of additional user interface elements, such as buttons 54, 56 and 58. The illustrated window 52 allows a user to manually insert a URL, or provide a URL list that can be imported into the window by clicking the import list button 54. The stored URL list can be created according to the systems and methods described in copending patent application Ser. No. 09/450,801, by the same inventors and filed herewith, the contents of which are herein incorporated by reference, or can be separately created and stored according to known techniques. The link facility 22 and/or the production agent or facility 26 can be employed to generate the window 50. The user can then insert the URL list into the document by clicking the OK button 56 of window 52. The URL list is then imported into the document. The importation and incorporation of the URL list is illustrated by the updated user interface element or window 60 of FIG. 4.

Figure 5:
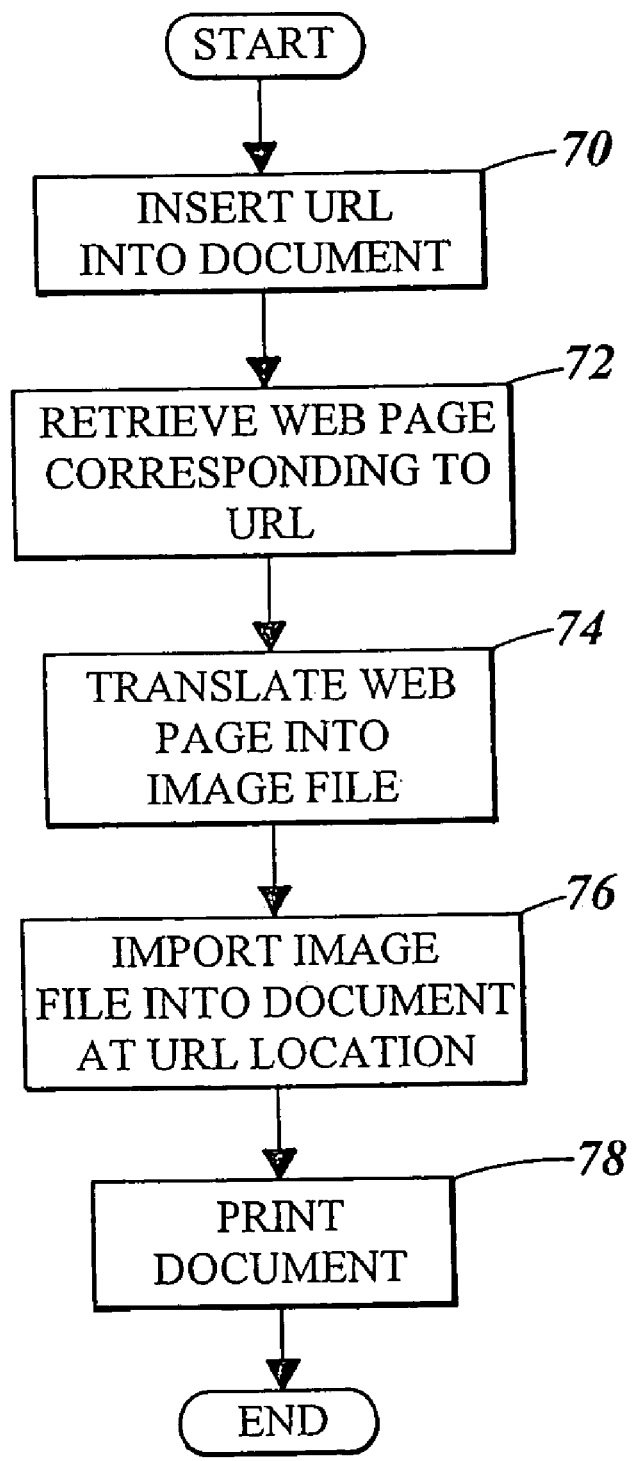
FIG. 5 is a schematic flow-chart diagram illustrating the operation of the printing system of FIG. 1 for inserting a link in a document in accordance with the teachings of the present invention.

In operation, the link facility 22 and/or production agent 26 can be employed to insert one or more links, such as a URL, into a document. With reference to FIG. 5, the link facility 22 and/or production agent 26 can insert a URL or a URL list into the document (step 70). The web browser 24 employs the URL to access a web page in the web 14, which in turn retrieves the web page and transfers the web page to the web browser 24 (step 72). The production agent 26 translates the web page into a suitable image file, as set forth above (step 74), which is then imported into the document created by the document creation algorithm at a selected location within the document, which can reside on the user's hard drive. (step 76). A user can then create a print job via the user interface 18 and forward the job (which contains the document) to the printing module 16. The printing module 16 then prints the document (step 78). The image file created by the production agent 26 is of the type that can be directly displayed by the user interface in human readable form, or can be incorporated directly into the document created by the document creation algorithm 20.

The link facility 22 can further generate or Insert a link into a document in order to allow content associated with that link to be incorporated into the document at the appropriate time. For example, the link provides for the ability to ensure that updated content associated with the link is Inserted at a selected document location. This methodology provides for an easy to use system for dynamically inserting rapidly, periodically changing content into the document.

A significant advantage of the present invention is that it provides for the ability to convert content contained within a web page into an image file for direct incorporation into a document. Moreover, the present invention creates an interactive environment for importing content in a readable format, such as an image file, into a document created by a document creation algorithm. The ability to retrieve and convert/translate the web page in an interactive environment significantly reduces the time necessary for capturing such content. For example, the production agent 26 avoids the need for capturing individually the web page, and then processing the web page after the connection to the web 14 is terminated. Rather, the present invention provides a system and method for acquiring web page content in a single interactive session, which can then be converted into an image file for incorporation in a document.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A method suitable for use with a printing system for dynamically linking changing content present in a page in a network with a document, said method comprising the steps of
    inserting a link into the document, said link corresponding to a page present in the network wherein the page includes a web page,
    automatically launching a browser in response to the link,
    automatically retrieving the content of the page from the network, and
    automatically converting the content of the page into an image file suitable for insertion into the document, and
    automatically inserting the converted content into the document.

2. The method of claim 1, wherein the step of inserting a link comprises the step of inserting a uniform resource locator (URL) into the document, and wherein the step of launching comprises the step of launching a web browser, wherein the URL corresponds to a web page in the network.

3. The method of claim 1, wherein the step of inserting comprises the step of directly inserting the converted content into the document such that when the document is accessed the converted content is displayed as a readable part of the document.

4. The method of claim 1, wherein the page includes a web page and the browser includes a web browser, further comprising the step of automatically, dynamically inserting the link into the document to dynamically retrieve content associated with the web page for subsequent incorporation into the document.

5. The method of claim 1, further comprising the step of repeating the steps of launching, retrieving, converting and inserting as a function of the number of links inserted into the document.

6. The method of claim 1 wherein the content of the page is inserted into the document such that when the document is printed into a hardcopy format the content of the page is printed into the hardcopy format as part of the document.

7. A printing system for automatically and dynamically linking content from an existing network page into a document generated using a document creation algorithm, the system comprising:
    a document creation algorithm for creating, retrieving or assembling a document;
    a link facility for manually creating and inserting a network link into the document wherein the link is associated with an existing network page;
    a browser for automatically accessing and retrieving the content of the network page associated with the link; and
    a production agent for automatically converting the content of the network page into an image file and for automatically inserting the content into the document.

8. The printing system of claim 6 wherein upon subsequent access of the document, the browser launches automatically accessing and retrieving the most recently updated content of the network page without need for action or knowledge of a user.

9. The printing system of claim 7 wherein upon subsequent access of the document, the production agent automatically converts the content of the network page into the image file and inserts the content of the network page into the document without need for action or knowledge of said user.

10. The printing system of claim 8 wherein the document and the inserted content of the network page are readily available in a readable format for display on a user interface or for printing.

* * * * *